S. T. Spaulding.
Cultivator.
N° 98,202. Patented Dec. 21, 1869.
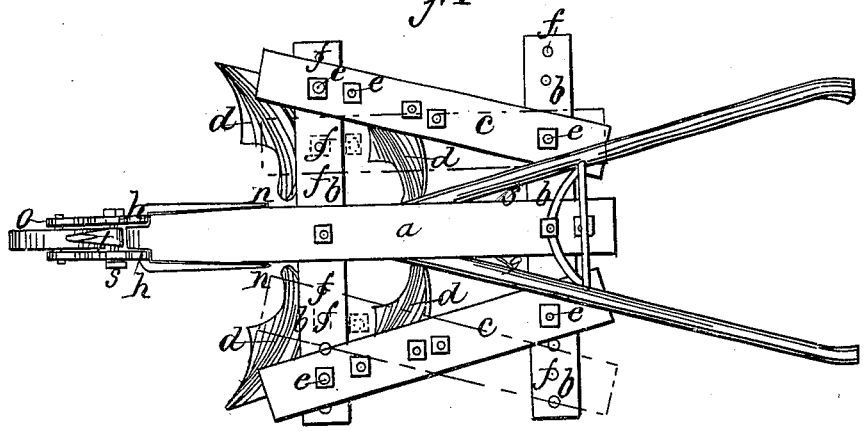
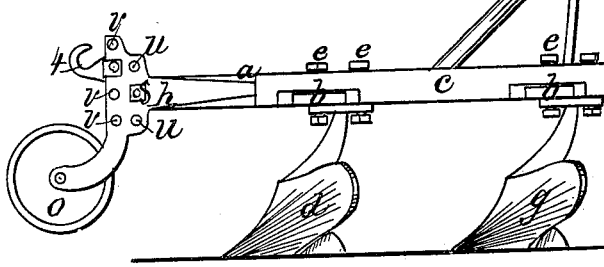
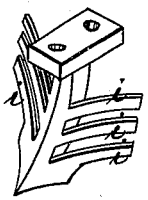
Witnesses
R. F. Osgood
Geo. W. Miatt
Inventor
S. T. Spaulding,
By J. Fraser & Co
attys

UNITED STATES PATENT OFFICE.

S. T. SPAULDING, OF NORTH COHOCTON, NEW YORK.

IMPROVEMENT IN CULTIVATORS.

Specification forming part of Letters Patent No. 98,202, dated December 21, 1869.

*To all whom it may concern:*

Be it known that I, S. T. SPAULDING, of North Cohocton, in the county of Steuben and State of New York, have invented a certain new and useful Improvement in Cultivators; and I do hereby declare that the following is a full and exact description thereof, reference being had to the accompanying drawings, making part of this specification, in which—

Figure 1 represents a plan of my improved cultivator; Fig. 2, a side elevation of the same; Fig. 3, a modification of the rear plow-point, showing it adapted to digging potatoes.

Like letters of reference indicate corresponding parts in all the figures.

My invention consists in the peculiar construction of the frame with the teeth attached, whereby a very great variety of adjustment is attained.

It further consists in the arrangement of the caster-frame, as hereinafter described.

In the drawings, $a$ represents the central beam, to which the handles are attached, and $b\ b$ represent cross-pieces at front and rear, rigidly mortised into said central beam and situated at right angles thereto. With these cross-pieces are connected side beams, $c\ c$, which slide loosely thereon, and are capable of any adjustment, being secured by bolts $e\ e$, which fit in any of a series of holes, $f\ f$, in the cross-pieces. These beams are adapted to receive teeth $d\ d$ and $g$, the former being single winged and the latter double, and all are capable of being changed in position from one side or end to the other, to accommodate the different adjustments of the beams, as will presently be described. The shanks of these teeth are secured to the beams by the same bolts $e\ e$ that secure the beams to the cross-pieces. This special construction of the frame secures a greater variety of adjustment in position than any other cultivator with which I am acquainted.

Ordinary cultivators are simply made to expand in the rear; others are made to adjust bodily or equally in front and rear. In addition to these ordinary adjustments, (which are indicated by the dotted lines at top and bottom in Fig. 1,) I secure the additional adjustment indicated by the black lines—viz., with the front ends of the side beams expanded and the rear ends contracted, thus forming the shape of a reversed >. By this adjustment, and with the wings of a series of the single teeth $d\ d$ set inward, I am enabled to produce ridging by gradually drawing the earth inward from the open to the closed end as the cultivator passes over. This result is owing to the special construction of the frame, by which the side beams are free to be slid out on the cross-pieces at the front end, which construction I believe to be original with myself. By the changing of the teeth $d\ d$ from one side to the other of the frame, I can either throw the soil to or from the rows, as necessity may require. When the wings are set inward, the soil is thrown from the rows, which is essential when the plants are small. In this case the double mold-board in the rear divides the furrow thrown up in the center and spreads it evenly between the rows. When the wings are set outward, the soil is thrown up around the roots, as is essential when the plants are considerably grown, and in this case the double mold-board, following in the rear, completes the hilling by throwing the center up on each side, thereby forming a central dead-furrow.

This device may also be adapted to digging potatoes by setting the front teeth with the wings outward, to throw the dirt away from the row, and employing a rear double mold-point with fingers $i\ i$, which elevate the potatoes in the same and sift them out. The caster-frame $h$ is pivoted at the rear end to the beam, as shown at $n$, and has the usual wheel, $o$, for gaging the depth of cut in the soil. The frame is cut with a double series of vertical holes, $u\ u$ and $v\ v$, the former allowing a vertical adjustment of the frame itself higher or lower by the use of a bolt, $s$, and the latter allowing a similar vertical adjustment of a separate clevis-hook, $t$, for the attachment of the draft-chain. This double adjustment I believe new, and I am thereby enabled to exactly adjust both the depth of cut and the draft with the greatest facility.

I am aware that various adjustments in the frames of cultivators have before been accomplished. Therefore I do not broadly claim adjusting the frame to a variety of positions. I only claim my special means for accomplishing the result.

I am also aware that clevis-frames have before had a vertical adjustment; but I claim such only when the separate hook $t$, having also a vertical adjustment, is employed therewith.

What I claim as my invention, and desire to secure by Letters Patent, is—

The combination, arrangement, and construction of the central beam, $a$, cross-bars $b\ b$, and side beams, $c\ c$, the doubly-adjustable clevis, and the adjustable single and double teeth $d\ d\ g$, the whole operating together as described.

In witness whereof I have hereunto signed my name in the presence of two subscribing witnesses.

S. T. SPAULDING.

Witnesses:
    LINDSLEY ADAMS,
    BYRON H. TYLER.